April 17, 1956 W. KNOLLE ET AL 2,742,025
INTERNAL-COMBUSTION ENGINES, PARTICULARLY HOT-BULB ENGINES
Filed Oct. 11, 1952 2 Sheets-Sheet 1

INVENTORS:
WILHELM KNOLLE
ANTON LENTZ
THEODOR LANIG
REINHARDT STIER
BY
ATTORNEY.

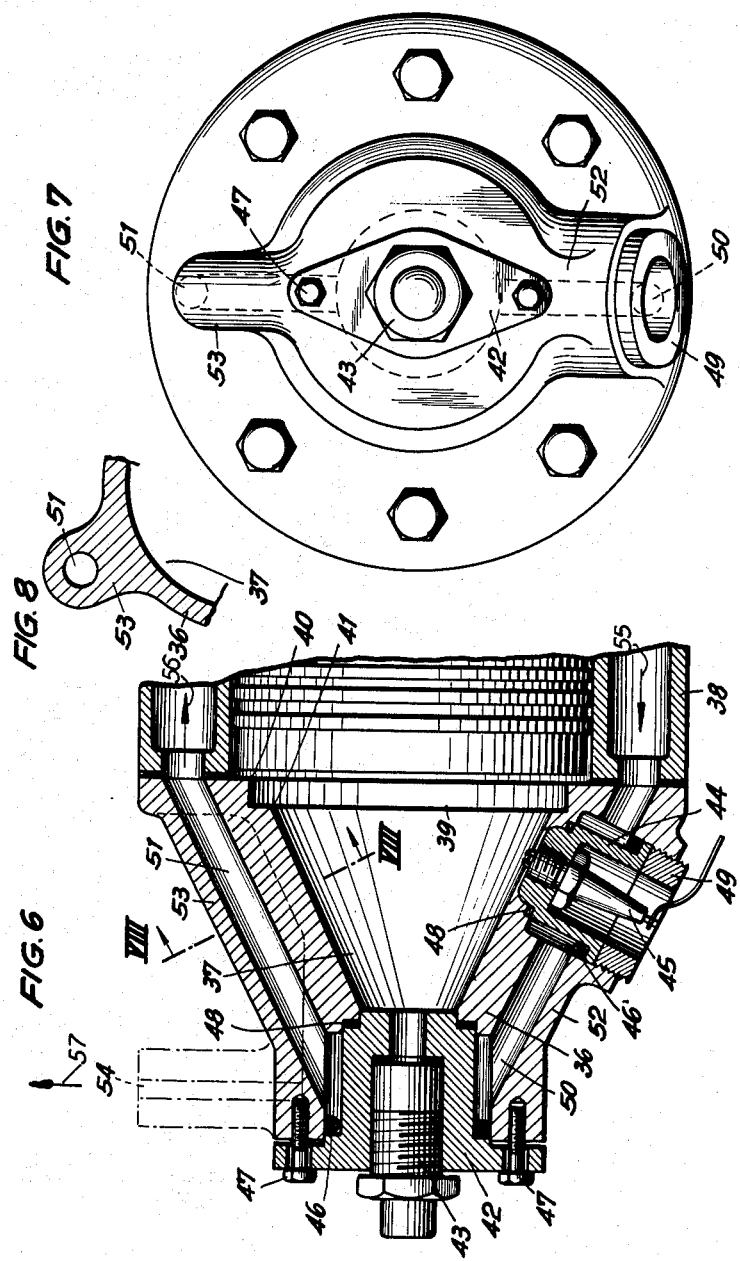

United States Patent Office 2,742,025
Patented Apr. 17, 1956

2,742,025

INTERNAL-COMBUSTION ENGINES, PARTICULARLY HOT-BULB ENGINES

Wilhelm Knolle and Anton Lentz, Heidelberg, and Theodor Lanig and Reinhardt Stier, Mannheim, Germany, assignors to Heinrich Lanz Aktiengesellschaft, Mannheim, Germany, a corporation of Germany Application October 11, 1952, Serial No. 314,246

Claims priority, application Germany October 17, 1951

13 Claims. (Cl. 123—32)

The present invention relates to internal combustion engines, particularly hot-bulb engines.

The main object of the invention is the provision of an internal combustion engine which operates at a great efficiency at relatively low compression.

In conventional internal combustion engines, in which the fuel is directly injected into the cylinder, the combustion chamber or the cylinder head is cooled. The engines comprise a whirling chamber discharging the burning mixture through narrow channels at high speed. These channels are usually effectively cooled, whereby heat is lost unnecessarily. This heat loss reduces compression and increases fuel consumption. Since these conventional engines operate at a low compression, fuel injection must be much advanced to assure ignition when the engine idles and highly heated heat accumulators must be provided which cause additional heat loss. The high gas velocity in the narrow portions of the combustion chamber also involve losses, increasing fuel consumption.

It is an object of the invention to provide an engine which operates under more favorable conditions by not cooling a portion of the cylinder head and providing a tapered combustion chamber whose large cross section faces the engine cylinder. In this way the losses, explained supra, during compression and combustion are avoided. Highly stressed heat accumulators which must be made of high heat resisting materials are unnecessary in engines according to the invention. The moderate temperature in the combustion chamber assures reliable operation, there being no direct cooling of the combustion gas. Fuel injection may be retarded and beginning of the ignition and the combustion process are more stable. These advantages afford an increase of the load on the engine by 25% and a reduction of the specific fuel consumption by 25% without a considerable increase of the maximal combustion pressure. A hot-bulb motor according to the invention reaches the economy of similar diesel engines at considerably lower compression. Because of the reduced cooling requirements, the fan and cooler are smaller, cost less, and require less power. Use of cooling air instead of water simplifies operation of the hot-bulb engine. The speed of the hot-bulb engine can be considerably increased.

The combustion chamber according to the invention is formed by a frustoconical wall which is preferably not cooled in the middle of its longitudinal extension. The conical combustion chamber is only cooled at its base and at its apex and/or at portions of its circumference.

The invention refers to all types of engines in which the fuel is directly injected, for example, engines in which the fuel injection nozzle is arranged in the cylinder near the joint between the cylinder and the cylinder head. The cylinder head, i. e. the combustion chamber, need not be cooled. The fuel injection nozzle and the spark plug may form parts of elements which are cooled independently of the cylinder head and which are removably inserted in the latter. Conventional injection nozzles and other heat-sensitive auxiliary devices are preferably cooled, whereas the cylinder head proper is not cooled.

The injection nozzle and the ignition device, for example a hot plug or a spark plug, are screwed into inserts which are removably connected with the cylinder head of an engine according to the invention. The inserts are cooled by a coolant, for example water, circulated in horizontal engines preferably by thermo-syphon action, through conduits which are so arranged on the cylinder head that as little heat as possible is removed from the latter, whereas as much as possible heat is removed from the inserts. To produce this differential cooling effect, the conduits are formed by tubes mounted on the cylinder head or by bores in ribs cast on the head. Since the inserts can be removed, the conduits are easily accessible for cleaning.

In engines which are started by means of a hot bulb, hot plug, or a spark plug, these means are arranged, according to the invention, in that zone of the combustion chamber in which the most favorable concentration of the fuel-air mixture occurs when the engine is started. In internal combustion engines in which the fuel is sprayed onto the piston head, the hot plug or spark plug is preferably arranged in the lower third of the cylinder head and as close as possible to the joint between the cylinder and the cylinder head. The inserts receiving the fuel injection nozzle and the hot plug or spark plug are preferably sealed against the combustion chamber by means of gaskets and to the outside by means of an elastic packing, for example a rubber ring, to prevent entry of coolant into the combustion chamber and escape of coolant to the outside.

It is an object of the invention to provide a cylinder head for an internal combustion engine which is not restricted adjacent to the engine cylinder, but has its greatest cross section thereat, this cross section, however, being smaller than the cross section of the cylinder. The cross section of the combustion chamber according to the invention is gradually reduced as its distance from the engine cylinder increases. This arrangement affords better scavenging of the combustion chamber than is the case in conventional hot bulb engines so that more oxygen can be supplied to the combustion chamber. The latter may have a conical or semispherical configuration or may be formed as a paraboloid. An annular surface is preferably provided on the side of the cylinder head facing the engine cylinder and an annular edge at the transition from the annular surface into the combustion chamber. This arrangement produces two desirable results: violent whirling of the combustion air while it is compressed into the combustion chamber, the air stream breaking up on the annular edge, and protection of the combustion chamber against unhindered flow of scavenging air. The latter effect of the new arrangement assures that enough combustion gas is retained in the combustion chamber which, together with the heat in the uncooled or little cooled wall of the cylinder head and the heat produced by compression, produce the temperature needed for igniting the fuel which is injected before the piston reaches dead center position.

Whereas a two-cycle, air-cooled Otto engine operates without difficulty, sliding conditions of the pistons in the cylinders of two-cycle diesel engines are not always satisfactory. This cannot be caused by the heat produced by the combustion of the fuel, since the over-all efficiency of diesel engines is greater than that of Otto engines. The difficulties experienced with diesel engines are caused by the considerably greater piston load due to the high compression and much higher peak pressures. The oil film on the internal surface of the cylinder of the diesel engine on which the piston rings slide is much more stressed than in an Otto engine. These difficulties are overcome by the present invention which provides an air-cooled internal combustion engine operating at lower compression and lower combustion pressures than a diesel engine. The compression ratio of the engine according to the invention is between 1:5 and 1:13 and the cylinder portion in which the piston slides is cooled by air. Ignition is effected by compression and by constructing the combustion chamber so that at least a portion of its wall is hotter than 390° F.

In a modified embodiment of the invention, a hot bulb is connected with and forms part of the combustion chamber which communicates with the engine cylinder through a channel.

Further and other objects of the present invention will be hereinafter set forth in the accompanying specification and claims, and shown in the drawing which, by way of illustration, shows what we now consider to be preferred embodiments of our invention.

In the drawing:

Fig. 6 is a part sectional view of the head portion of another modification of an internal combustion engine according to the invention;

Fig. 7 is an outside end view of the cylinder head of the engine illustrated in Fig. 6;

Fig. 8 is a section through a portion of the cylinder head shown in Fig. 6, the section being taken along line VIII—VIII of Fig. 6.

Like parts are designated by like numerals in all figures of the drawing.

Figure 1:
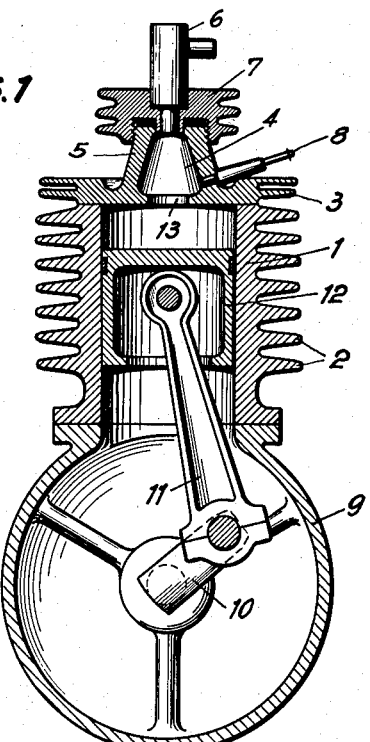
Fig. 1 is a longitudinal section through an internal combustion engine according to the invention having an uncooled combustion chamber.

Referring more particularly to Fig. 1 of the drawing, numeral 1 designates a cylinder which is provided with cooling ribs 2. The top of the cylinder is closed by a conical cylinder head 5 enclosing a combustion chamber 4. The latter has a tapered inside configuration, the largest cross section of the combustion chamber being smaller than the cross section of the cylinder. The lower part of the head 5 is cooled by ribs 3. A fuel injection nozzle 6, which is cooled by a ribbed body 7, is coaxially inserted in the top of the conical cylinder head. A spark plug 8 is inserted in the lateral wall of the combustion chamber. A crank case 9 is connected with the lower end of the cylinder 1 in the conventional manner. A crank shaft 10 is supported by the crank case. The crank shaft is actuated by a connecting rod 11 which is swingably connected with a piston 12.

The part of the cylinder head 5 facing the engine cylinder is provided with a throat having an opening 13 whose transverse dimension is smaller than the diameter of the cylinder 1, resulting in a relatively great covering of the piston head by the bottom of the head 5 and greater compression of the combustion air thereat than in the combustion chamber. This facilitates mixing of the fuel and air and assures reliable combustion, particularly when the engine idles.

Figure 2:
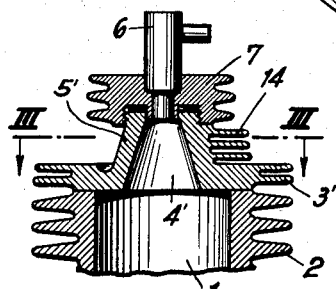
Fig. 2 is a longitudinal sectional view of the upper part of a modified internal combustion engine according to the invention having a partly cooled combustion chamber.
Figure 3:
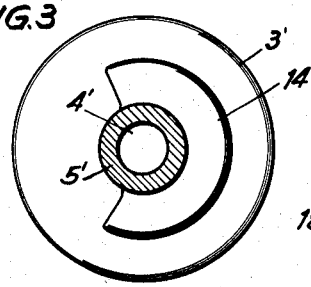
Fig. 3 is a cross section taken along line III—III of Fig. 2.

In the modification illustrated in Figs. 2 and 3, the throat at the outlet of the combustion chamber 4' has been omitted and the flow area of the frusto-conical combustion chamber is greatest where it faces the piston. However, it is smaller than the cross section of the cylinder 1. In addition to cooling ribs 3' at its bottom, the cylinder head 5' is provided with ribs 14 at a portion only, say at two thirds, of its circumference, affording local cooling of the combustion chamber wall.

Figure 4:
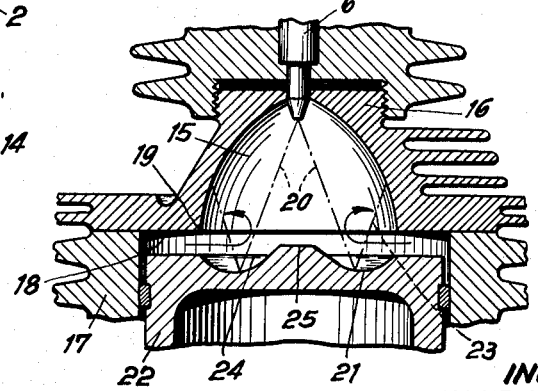
Fig. 4 is a longitudinal sectional view of the top portion of a further modification of an internal combustion engine according to the invention.

Fig. 4 illustrates a combustion chamber 15 having substantially semispherical configuration, more particularly, the configuration of a paraboloid. The outside of the cylinder head 16 forming the combustion chamber may be constructed similarly to that shown in Fig. 1 or in Fig. 2, the latter construction being illustrated. The combustion space is greatest at the lower end of the head 16, yet smaller than the inside of the engine cylinder 17. The combustion space is gradually reduced as it extends upwardly in the head 16. There is an annular surface 18 at the bottom of the cylinder head which is coaxial of cylinder 17, and an edge 19 at the transition from the cylinder to the combustion chamber. Near the end of the compression stroke, the fuel is injected through nozzle 6 in the form of a conical jet 20 and is thrown onto the hot surface 21 of the piston 22 so that it is partly reflected into a mixing zone 23 in the combustion chamber 15. This effects thorough mixture of the heated and evaporated fuel with the combustion air. The annular surface 18, in cooperation with the edge 19, produces a violent eddy current of the air compressed along a path substantially as shown by the arrows in Fig. 4, during the compression stroke of piston 22, the current being broken by the edge 19. The surface 18 protects the combustion space 15 against complete washing out of combustion residues during the scavenging process. Though the new cylinder head arrangement effects more thorough scavenging of the combustion chamber than conventional arrangements, enough gas is retained in chamber 15 to assure, together with the heat released from the cylinder head 16 and from the piston head 21, and with the heat produced by compression, that the ignition temperature of the fuel is reached. Controlled cooling assures that the walls of the cylinder head do not cool below a predetermined minimum temperature, i. e. cooling is preferably so regulated that the combustion chamber walls have always the temperature most favorable for the combustion process. A temperature of the inside wall of the combustion chamber exceeding 390° F. has been found to effect reliable ignition in engines according to the invention which operate at compression ratios between 1:5 and 1:13.

The piston head 21 may be provided with a substantially annular recess 24, whose cross section resembles a portion of an ellipse, and with a central protuberance 25. The recess 24 is preferably so shaped that it forms a continuation of the combustion chamber when piston 22 is in uppermost position.

Figure 5:
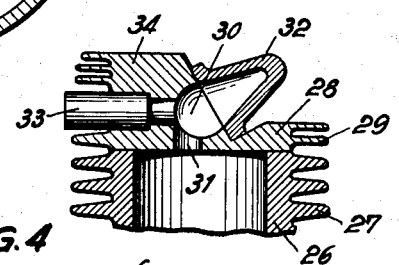
Fig. 5 is a longitudinal sectional view of the top portion of a third modification of an internal combustion engine according to the invention.

Fig. 5 illustrates the top of a hot bulb engine whose cylinder 26 is provided with cooling ribs 27. A head 28 provided with cooling ribs 29 is mounted on the cylinder. The cylinder head 28 has a semispherical cavity 30 communicating with cylinder 26 by means of a jet channel 31. A hot-bulb 32 is placed on the cylinder head to cover the cavity 30. The hot-bulb may be heated from the outside by conventional means, not shown. A nozzle 33 screwed in the more extensively cooled portion 34 of the cylinder head discharges fuel into cavity 30 in a direction toward the hot-bulb. Cooling air may be blown onto the cooling ribs by a fan in the conventional manner.

In the embodiment shown in Figs. 6 to 8, only the heat sensitive auxiliary devices connected with the cylinder head 36 are cooled; the other parts of the head, forming a combustion chamber 37, are not cooled. The part of the cylinder head which is adjacent to the engine cylinder 38 is provided with a recess 39 whose diameter is smaller than that of the engine cylinder. In this way a step and two circular edges 40 and 41 are formed causing more intensive whirling of the combustion air when it is compressed into the chamber 37. Numeral 42 designates an insert receiving a fuel injection nozzle 43. Numeral 44 designates an insert adapted to receive a spark plug 45. Insert 42 is pressed against the cylinder head 36 by means of two studs 47. Insert 44 is secured in the cylinder head 36 by means of an annular nut 49. Inserts 42 and 44 individually have flanges distal of the combustion chamber and abutting against the cylinder head. Resilient packings 46 and 46', for example rubber rings, individually surround the inserts 42 and 44, respectively, and are placed adjacent to the flanges. The inserts 42 and 44 individually have shoulders near the combustion chamber and the latter has recesses individually facing said shoulders. Gaskets 48 and 48' are inserted between the shoulders and the recesses. The spark plug and the fuel injection nozzle are cooled by a coolant circulating through bores 50 and 51 in thickened parts 52 and 53, respectively, of the wall of the cylinder head 36 (see Fig. 8). If the engine cylinder is in horizontal position, the coolant, for example water, is circulated by thermosyphon action from the cooling jacket in one side of the wall of cylinder 38 into the cooling jacket in the other side of the cylinder wall in the direction of the arrows 55 and 56 in Fig. 6 and flows completely around the inserts 44 and 42. If the engine cylinder is in vertical position, the coolant flows from the jacket in the wall of cylinder 36 through conduits 50 and 51 and leaves the conduits through a bore in boss 54 in the direction of arrow 57.

While we believe the above described embodiments of our invention to be preferred embodiments, we wish it to be understood that we do not desire to be limited to the exact details of method, design, and construction shown and described, for obvious modifications will occur to a person skilled in the art.

What is claimed is:

1. An internal combustion engine comprising a cylinder, a power piston operating therein, a cylinder head mounted on said cylinder and including a conical part forming a combustion chamber, a fuel injection nozzle connected with said cylinder head for discharging fuel through said combustion chamber into said cylinder, and cooling means connected with a portion of the circumference of said conical part, leaving the rest of the circumference of said conical part uncooled.

2. An internal combustion engine comprising a cylinder, a power piston operating therein, a cylinder head mounted on said cylinder, a combustion chamber in said cylinder head, a fuel injection nozzle connected with said cylinder head for discharging fuel through said combustion chamber into said cylinder, ignition means connected with said cylinder head, and cooling means connected with said cylinder head adjacent to said nozzle and to said ignition means, leaving the rest of the cylinder head uncooled.

3. An internal combustion engine comprising a cylinder, a power piston operating therein, a cylinder head mounted on said cylinder, a combustion chamber in said cylinder head, a first insert removably connected with said cylinder head, a fuel injection nozzle screwed into said first insert for discharging fuel through said combustion chamber into said cylinder, a second insert removably connected with said cylinder head, ignition means screwed into said second insert, and cooling means individually connected with said inserts, leaving the rest of the cylinder head uncooled.

4. An internal combustion engine according to claim 3, said cooling means comprising conduits individually surrounding said inserts and conduit means interconnecting said conduits for passing a coolant therethrough.

5. An internal combustion engine comprising a cylinder, a power piston operating therein, a cylinder head mounted on said cylinder, a combustion chamber in said cylinder head, a fuel injection nozzle connected with said cylinder head for discharging fuel through said combustion chamber into said cylinder, ignition means connected with said cylinder head adjacent to said cylinder, and cooling means connected with said cylinder head adjacent to said nozzle and to said ignition means, leaving the rest of the cylinder head uncooled.

6. An internal combustion engine comprising a cylinder, a power piston operating therein, a cylinder head mounted on said cylinder, a combustion chamber in said cylinder head, a first insert removably connected with said cylinder head, a fuel injection nozzle screwed into said first insert for discharging fuel through said combustion chamber into said cylinder, a second insert removably connected with said cylinder head, ignition means screwed into said second insert, cooling means connected with said inserts, leaving the rest of the cylinder head uncooled, said inserts individually having a shoulder near the combustion chamber, a recess in said cylinder head facing said shoulder, gaskets individually inserted between said shoulders and said recesses, said inserts individually having a flange distal of the combustion chamber and abutting against said cylinder head, and resilient packings individually surrounding said inserts adjacent to said flanges.

7. An internal combustion engine comprising a cylinder, a power piston in said cylinder, a cylinder head mounted on said cylinder and including a conical part forming a combustion chamber, said combustion chamber having an interior wall and a tapered inside configuration, the largest cross section of said combustion chamber facing said cylinder and being smaller than the cross section of said cylinder, an annular recess in said interior wall forming a step having an annular surface disposed substantially at a right angle to the cylinder axis and facing said cylinder, a fuel injection nozzle connected with said cylinder head for discharging fuel through said combustion chamber into said cylinder, and cooling means connected with a portion of the circumference of said conical part of said cylinder head for cooling a portion of said part and leaving the rest of the circumference of said conical part uncooled.

8. An internal combustion engine comprising a cylinder, cooling means connected with said cylinder, a power piston operating in said cylinder at compression ratios between 1:5 and 1:13, a cylinder head mounted on said cylinder, said cylinder head having a conical part forming a combustion chamber having an inside wall, a fuel injection nozzle connected with said cylinder head for discharging fuel through said combustion chamber into said cylinder, cooling means connected with a portion of the circumference of said conical part, said cooling means leaving the rest of the circumference of said conical part uncooled for maintaining the temperature of a portion of the inside wall of said combustion chamber at a temperature which is higher than 390° F. to effect ignition of the compressed fuel-air mixture.

9. An internal combustion engine comprising a cylinder, a power piston operating therein, a cylinder head mounted on said cylinder and including a substantially semi-spherical part forming a combustion chamber, a fuel injection nozzle connected with said cylinder head for discharging fuel through said combustion chamber into said cylinder, and cooling means connected with a portion of the circumference of said semispherical part, leaving the rest of the circumference of said semispherical part uncooled.

10. An internal combustion engine comprising a cylinder, a power piston operating therein, a cylinder head mounted on said cylinder and including a substantially paraboloidal part forming a combustion chamber, a fuel injection nozzle connected with said cylinder head for discharging fuel through said combustion chamber into said cylinder, and cooling means connected with a portion of the circumference of said paraboloidal part, leaving the rest of the circumference of said paraboloidal part uncooled.

11. An internal combustion engine comprising a cylinder, a power piston in said cylinder, a cylinder head mounted on said cylinder and including a tapered part forming a combustion chamber, the largest cross section of said combustion chamber facing said cylinder and being smaller than the cross section of said cylinder, said cylinder head having an annular end surface positioned transversely to the longitudinal axis of and facing said cylinder, said power piston having a surface facing said annular end surface and forming therewith a zone of eddy currents during the compression stroke of said piston, a fuel injection nozzle connected with said cylinder head for discharging fuel through said combustion chamber onto said piston surface to be reflected thereby, and cooling means connected with a portion of the circumference of said tapered part for cooling a part of the circumference of said tapered part.

12. An internal combustion engine comprising a cylinder, a power piston in said cylinder, a cylinder head mounted on said cylinder and including a tapered part forming a combustion chamber, the largest cross section of said combustion chamber facing said cylinder and being smaller than the cross section of said cylinder, said power piston having a surface facing said combustion chamber, a protuberance in the center of said surface, a fuel injection nozzle connected with said cylinder head for discharging fuel through said combustion chamber onto said piston surface to be reflected thereby, and cooling means connected with a portion of the circumference of said tapered part for cooling only a part of the circumference of said tapered part.

13. An internal combustion engine comprising a cylinder, a power piston in said cylinder, a cylinder head mounted on said cylinder and including a tapered part forming a combustion chamber, the largest cross section of said combustion chamber facing said cylinder and being smaller than the cross section of said cylinder, said power piston having a surface facing said combustion chamber, an annular recess in and concentric of said surface and having a cross sectional configuration resembling a portion of an ellipse, a fuel injection nozzle connected with said cylinder head for discharging fuel through said combustion chamber into said recess to be reflected thereby, and cooling means connected with a portion of the circumference of said tapered part of said cylinder head.

References Cited in the file of this patent

UNITED STATES PATENTS

| | | |
|---|---|---|
| 785,687 | Tuck et al. | Mar. 21, 1905 |
| 2,349,305 | Pyk | May 23, 1944 |

FOREIGN PATENTS

| | | |
|---|---|---|
| 330,990 | Great Britain | June 23, 1930 |
| 692,886 | France | Nov. 12, 1930 |
| 753,955 | France | Oct. 28, 1933 |